United States Patent
Gao et al.

(10) Patent No.: US 11,997,710 B2
(45) Date of Patent: May 28, 2024

(54) COMMUNICATIONS AMONG CELLS OF DIFFERENT GEOGRAPHIC COVERAGE

(71) Applicant: ZTE CORPORATION, Guangdong (CN)

(72) Inventors: Yuan Gao, Shenzhen (CN); He Huang, Shenzhen (CN); Xiaojuan Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 384 days.

(21) Appl. No.: 17/381,868

(22) Filed: Jul. 21, 2021

(65) Prior Publication Data

US 2021/0352714 A1    Nov. 11, 2021

Related U.S. Application Data

(63) Continuation of application No. PCT/CN2019/073189, filed on Jan. 25, 2019.

(51) Int. Cl.
*H04W 74/00* (2009.01)
*H04W 36/00* (2009.01)
*H04W 74/0833* (2024.01)

(52) U.S. Cl.
CPC ..... *H04W 74/008* (2013.01); *H04W 36/0005* (2013.01); *H04W 74/0833* (2013.01)

(58) Field of Classification Search
CPC .......... H04W 74/008; H04W 36/0005; H04W 74/0833; H04W 74/02; H04W 36/0007; H04W 74/0841; H04W 74/08; H04W 48/20; H04W 48/12; H04W 74/00; H04W 36/00

See application file for complete search history.

(56) References Cited

U.S. PATENT DOCUMENTS

2016/0255658 A1* 9/2016 Fujishiro ............... H04L 5/0053
370/329
2018/0035466 A1 2/2018 Rune et al.
(Continued)

FOREIGN PATENT DOCUMENTS

CN 103583009 A 2/2014
CN 104039015 A 9/2014
(Continued)

OTHER PUBLICATIONS

International Search Report and Written Opinion for PCT Appl. No. PCT/CN2019/073189, mailed Oct. 24, 2019 (7 pages).
(Continued)

*Primary Examiner* — Mewale A Ambaye
(74) *Attorney, Agent, or Firm* — Foley & Lardner LLP

(57) ABSTRACT

This disclosure relates generally to wireless communications and, more particularly, to systems and methods for reselection or redirection among cells of different geographic coverage. In one embodiment, a method performed by a communication device includes: receiving configuration information from a first communication node, wherein the first communication node is part of a first cell or a first carrier; determining a second communication node based on the configuration information, wherein the second communication node is part of a second cell or a second carrier; and initializing a random access procedure or continuing with the random access procedure on the second communication node.

20 Claims, 10 Drawing Sheets

(56) References Cited

U.S. PATENT DOCUMENTS

2021/0105825 A1\* 4/2021 Wang ................ H04L 27/2613
2022/0046635 A1\* 2/2022 Liou ..................... H04W 72/23
2022/0053590 A1\* 2/2022 Ma ........................ H04W 76/19

FOREIGN PATENT DOCUMENTS

| CN | 104159242 A | 11/2014 | |
|---|---|---|---|
| CN | 105451355 A | 3/2016 | |
| CN | 107079501 A | 8/2017 | |
| WO | WO-2018/175809 A1 | 9/2018 | |
| WO | WO-2018175809 A1 \* | 9/2018 | ........ H04W 36/0077 |
| WO | WO-2018/203698 A1 | 11/2018 | |

OTHER PUBLICATIONS

Extended European Search Report for EP Appl. No. 19911860.5, dated Jan. 14, 2022 (7 pages).
Ericsson, "Random access procedure for low complexity and coverage enhanced UEs" 3GPP TSG-RAN WG2 #89 Tdoc, R2-150456, Feb. 13, 2015, Athens, Greece (7 pages).
First Office Action for CN Appl. No. 201980090125.9, dated Nov. 25, 2022 (with English translation, 23 pages).
ZTE, "Physical Random Access Channel Coverage Enhancement" 3GPP TSG RAN WG1 Meeting #74, R1-133063, Aug. 23, 2013, Barcelona, Spain (8 pages).

\* cited by examiner

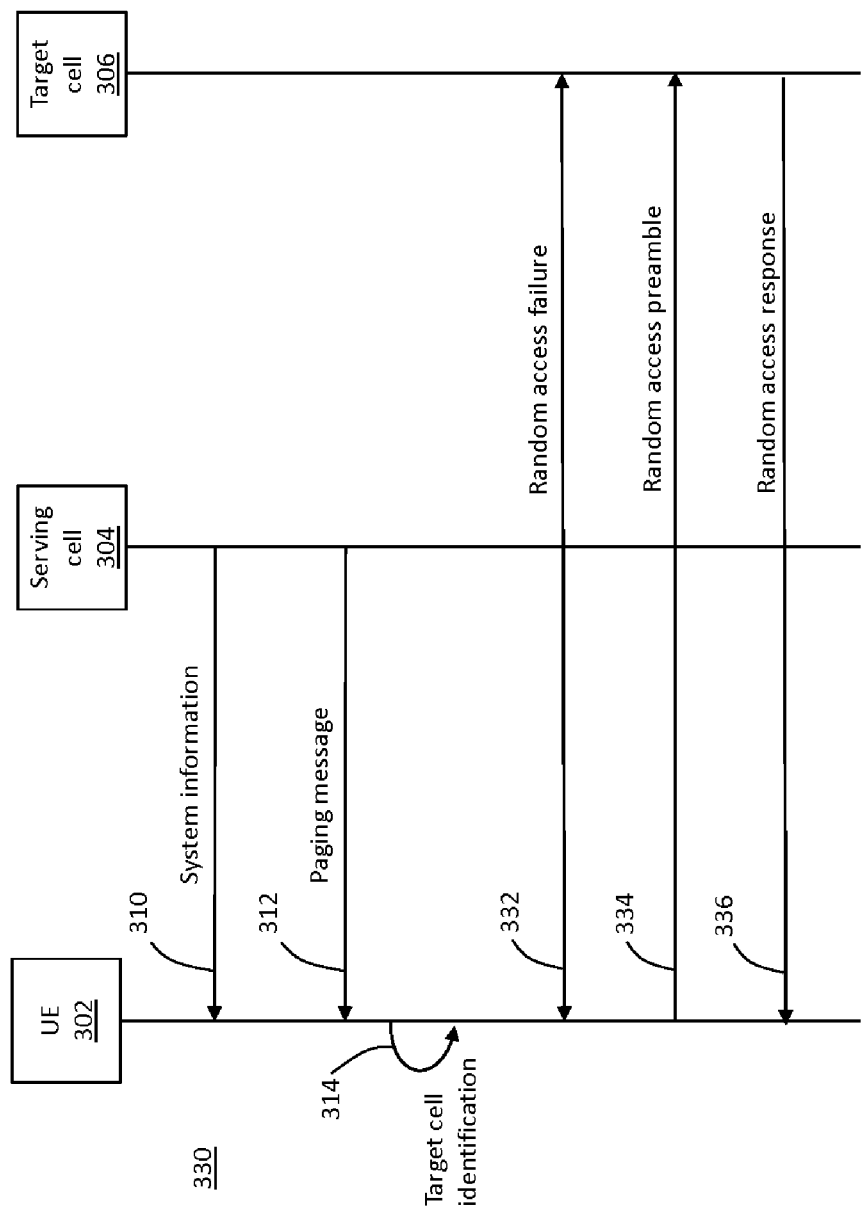

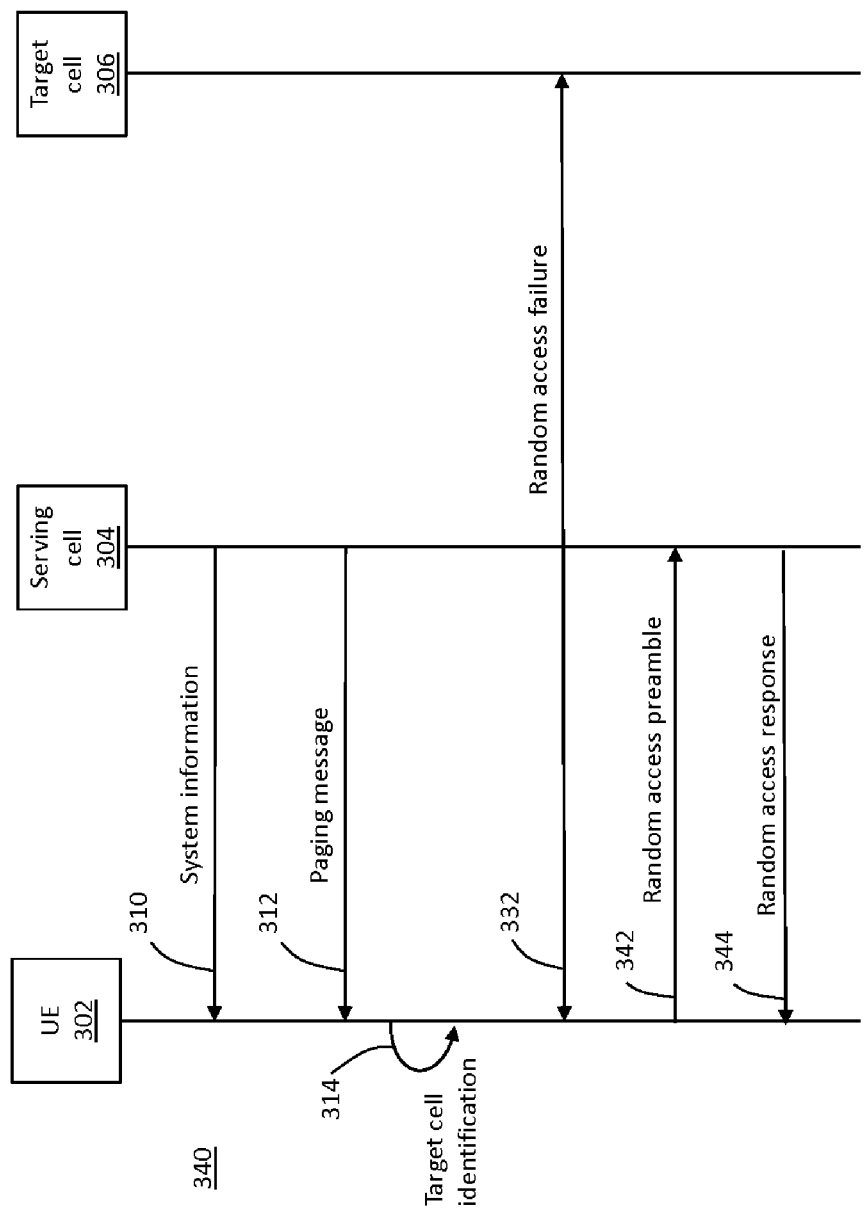

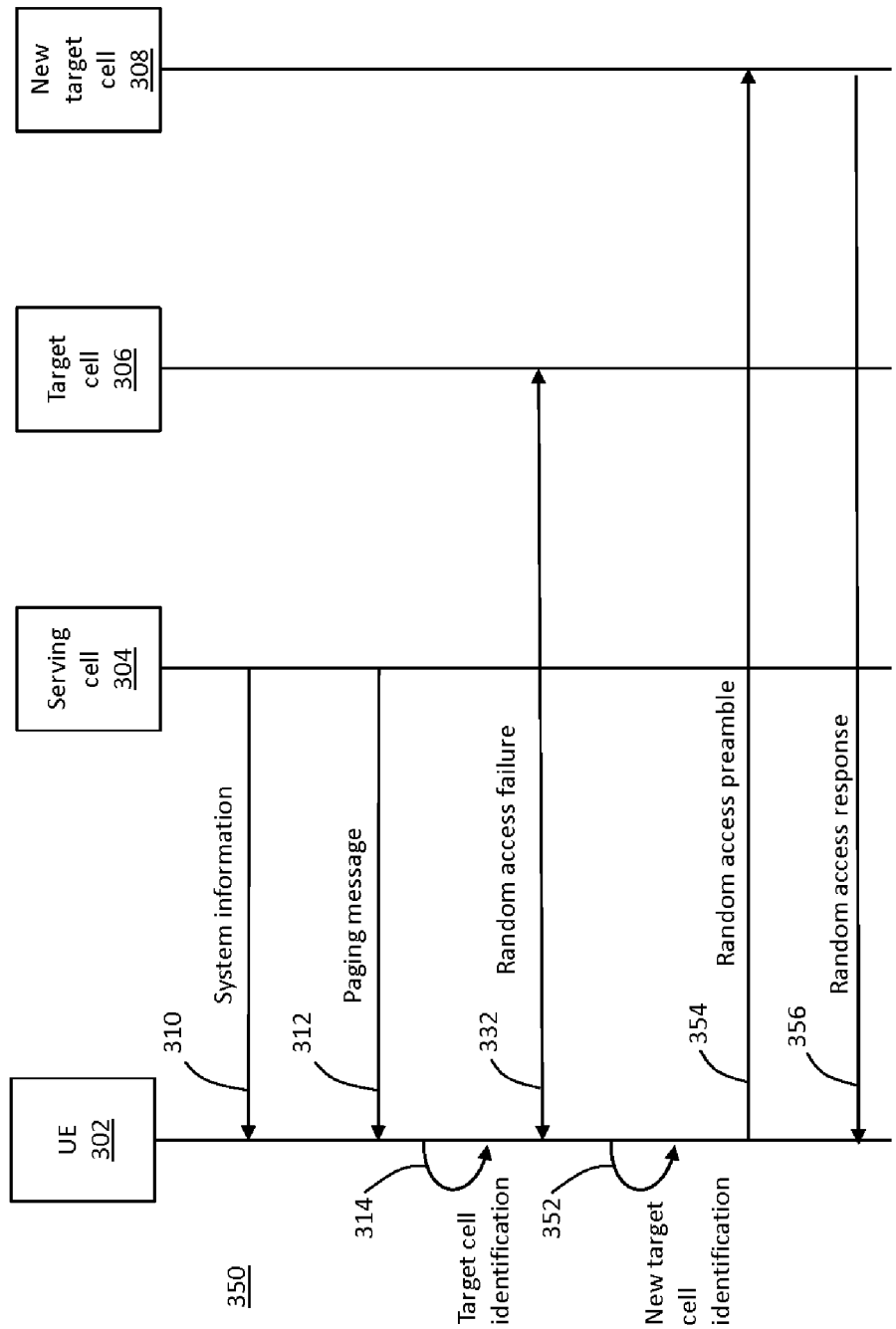

COMMUNICATIONS AMONG CELLS OF DIFFERENT GEOGRAPHIC COVERAGE

CROSS-REFERENCE TO RELATED APPLICATION

This application claims the benefit of priority under 35 U.S.C. § 120 as a continuation of PCT Patent Application No. PCT/CN2019/073189, filed on Jan. 25, 2019, the disclosure of which is incorporated herein by reference in its entirety.

TECHNICAL FIELD

This disclosure relates generally to wireless communications and, more particularly, to systems and methods for reselection or redirection among cells of different geographic coverage.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

Communication throughput be dependent upon an amount of delay time that communications are in transition between a transmitter and receiver. Current techniques for communications may not account for longer delay times, such as in communications between a satellite orbiting the Earth and a device not orbiting the Earth. Therefore, current communication techniques may not be entirely satisfactory.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication device includes: receiving configuration information from a first communication node, wherein the first communication node is part of a first cell or a first carrier; determining a second communication node based on the configuration information, wherein the second communication node is part of a second cell or a second carrier; and initializing a random access procedure or continuing with the random access procedure on the second communication node.

In a further embodiment, a method performed by a first communication node and a second communication node, including: transmitting configuration information to a communication device by the first communication node, wherein the first communication node is part of a first cell or a first carrier; receiving a random access preamble from the communication device by the first communication node or the second communication node, wherein the second communication node is part of a second cell or a second carrier; and transmitting a random access response to the communication device by the first communication node or the second communication node.

In a further embodiment, a communication device includes: a receiver configured to: receive configuration information from a first communication node, wherein the first communication node is part of a first cell or a first carrier; and a processor configured to: determine a second communication node based on the configuration information, wherein the second communication node is part of a second cell or a second carrier, and initialize a random access procedure or continue with the random access procedure on the second communication node.

In a further embodiment, a system includes: a first communication node configured to transmit configuration information to a communication device by the first communication node, wherein the first communication node is part of a first cell or a first carrier; and a second communication node configured to receive a random access preamble from the communication device by the second communication node, wherein the second communication node is part of a second cell or a second carrier.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

FIG. 3B is a sequence diagram illustrating a network triggered redirection process where random access toward a target cell is retried upon random access failure, in accordance with some embodiments.

FIG. 3C is a sequence diagram illustrating a network triggered redirection process where random access toward a serving cell is performed upon random access failure, in accordance with some embodiments.

FIG. 3D is a sequence diagram illustrating a network triggered redirection process where random access toward a new target cell is performed upon random access failure, in accordance with some embodiments.

DETAILED DESCRIPTION

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
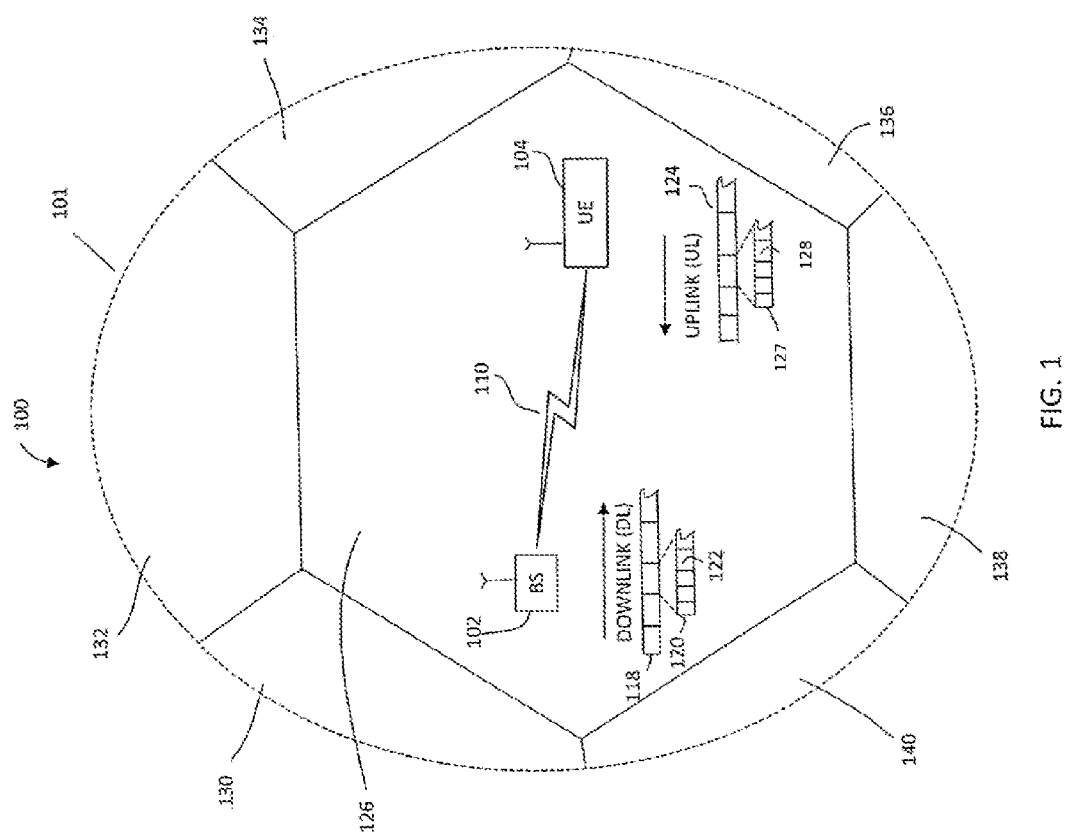
FIG. 1 illustrates an exemplary wireless communication network in which techniques disclosed herein may be implemented, in accordance with some embodiments.

FIG. 1 illustrates an exemplary wireless communication network 100 in which techniques disclosed herein may be implemented, in accordance with an embodiment of the present disclosure. Such an exemplary network 100 includes a base station 102 (hereinafter "BS 102") and multiple user equipment devices 104 (hereinafter "UEs 104") that can communicate with each other via respective communication links 110 (e.g., a wireless communication channel), and a cluster of notional cells 126, 130, 132, 134, 136, 138 and 140 overlaying a geographical area with a network 101. Each UE 104 may undergo a random access procedure to join the network 101. In FIG. 1, the BS 102 and each UE 104 are contained within a respective geographic boundary of cell 126. Each of the other cells 130, 132, 134, 136, 138 and 140 may include at least one BS operating at its allocated bandwidth to provide adequate radio coverage to its intended users. Accordingly, reference to a cell may be a short hand reference to a BS with an associated coverage region or area (e.g., cell). In certain embodiments, a cell may be interchangeably referred to as a BS or a node.

For example, the BS 102 may operate at an allocated channel transmission bandwidth (e.g., spectrum) to provide adequate coverage to each UE 104. The spectrum may be regulated to define a licensed range and/or an unlicensed range. The BS 102 and each UE 104 may communicate via a downlink radio frame 118, and an uplink radio frame 124 respectively. The radio frames may also be referred to more simply as a frame. Each frame 118/124 may be further divided into sub-frames 120/127 which may include data symbols 122/128. In the present disclosure, the BS 102 and each UE 104 are described herein as non-limiting examples of "communication nodes," generally, which can practice the methods disclosed herein. Such communication nodes may be capable of wireless and/or wired communications, in accordance with various embodiments of the invention. In certain embodiments, a communication device may refer more specifically to a UE in relationship to a BS and a communication node may refer more specifically to a BS in relation to the UE.

Figure 2:
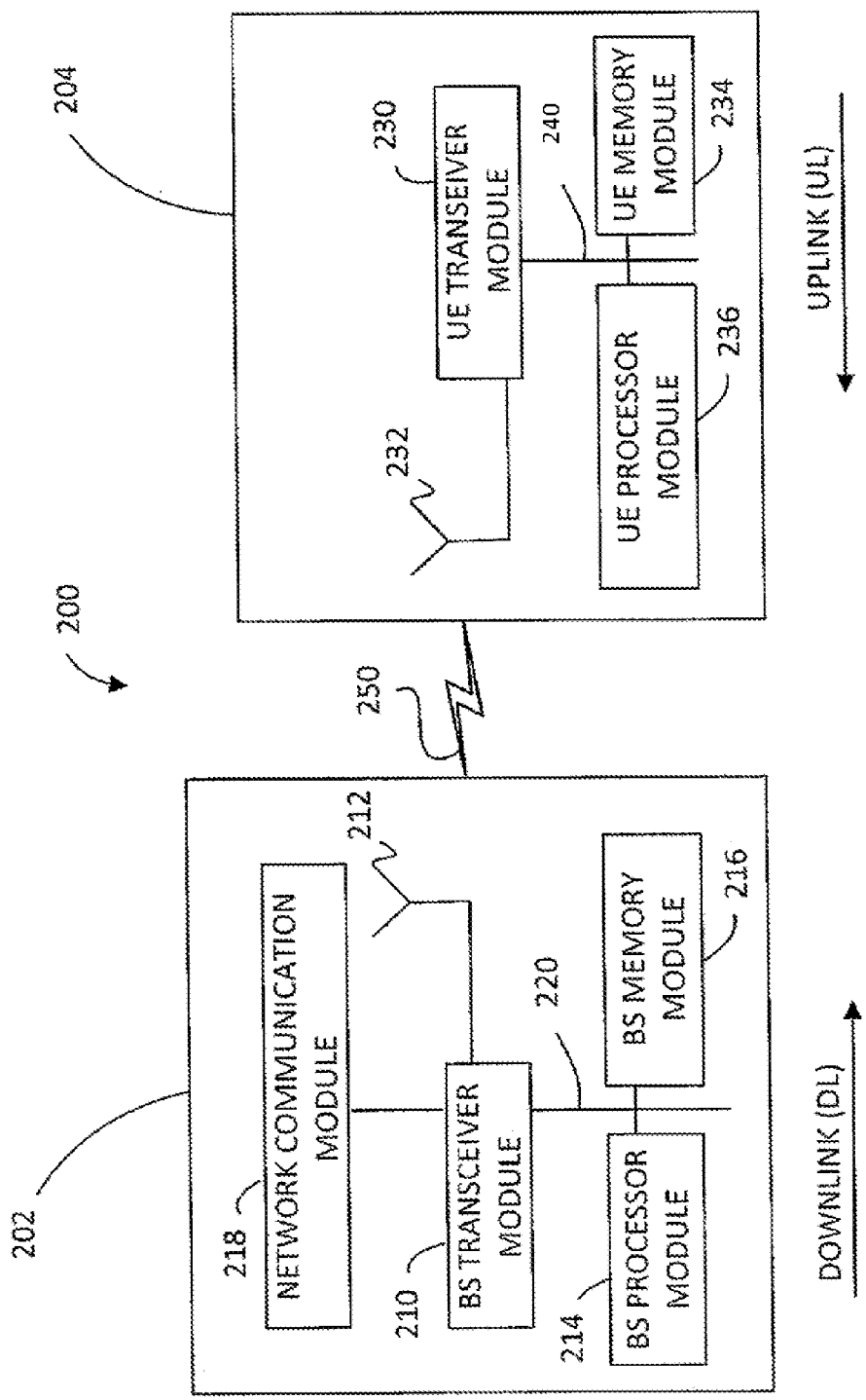
FIG. 2 illustrates a block diagram of an exemplary wireless communication system for transmitting and receiving wireless communication signals in accordance with some embodiments.

FIG. 2 illustrates a block diagram of an exemplary wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment or network 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuity that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage and/or computer-readable medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

Certain cells may have different round trip delay (RTD) than others. For example, a non-terrestrial network (NTN) cell that communicates using a satellite in orbit around the Earth may have a longer RTD than a cell within a terrestrial network (TN) on the Earth (e.g., on the ground on the Earth). However, the cell in the TN may cover a smaller geographic area than the NTN cell. To take advantage of such a heterogeneous network (e.g., among NTN cells and/or TN cells), it may be possible for a UE to receive paging from a serving cell with a relatively larger coverage area (e.g., a cell with coverage over a relatively larger area) and then to switch to a target cell of a relatively smaller coverage area to initiate a random access procedure and establish a radio resource control (RRC) connection. Then, after completing the data or signaling transmission under the RRC connection, the UE may revert or redirect back to the cell covering a larger area to receive paging.

In a NTN, satellites may be largely divided into geostationary Earth orbit (GEO) satellites and non-GEO satellite. A GEO satellite may revolve around the Earth around once a day so as to generally appear stationary from the Earth. The altitude of GEO satellite may be, for example, 35,786 kilometers (km). The GEO satellite may support a relatively large coverage area due to its high orbital elevation. However, the GEO satellite may also suffer from a long propagation delay (e.g., RTD). Exemplary time delay characteristics of a GEO satellite is shown in following table.

TABLE 1

Exemplary propagation delays for a GEO satellite at 35786 km

| | GEO at 35786 km | | |
|---|---|---|---|
| Elevation angle | Path | D (km) | Time (ms) |
| UE: 10° | satellite-UE | 40586 | 135.286 |
| GW: 5° | satellite-gateway | 41126.6 | 137.088 |
| 90° | satellite-UE | 35786 | 119.286 |

TABLE 1-continued

Exemplary propagation delays for a GEO satellite at 35786 km

| | | GEO at 35786 km | |
|---|---|---|---|
| Elevation angle | Path | D (km) | Time (ms) |
| Bent Pipe satellite | | | |
| One way delay | Gateway-satellite_UE | 81712.6 | 272.375 |
| Round trip Time | Twice | 163425.3 | 544.751 |
| Regenerative Satellite | | | |
| One way delay | Satellite-UE | 40586 | 135.286 |
| Round Trip Time | Satellite-UE-Satellite | 81172 | 270.572 |

There may be many types of non-GEO satellites. These non-GEO satellites may include, for example, a low Earth orbit (LEO) satellite and a medium earth orbit (MEO) satellite. Because of a lower orbital altitude, in contrast to a GEO satellite, these non-GEO satellites may revolve around the earth every 2~3 hours, for example. Exemplary time delay characteristics of non-GEO satellites are shown in following table.

TABLE 2

Exemplary propagation delays for different non-GEO satellites

| | | LEO at 600 km | | LEO at 1500 km | | MEO at 10000 km | |
|---|---|---|---|---|---|---|---|
| Elevation angle | Path | Distance D (km) | Delay (ms) | Distance D (km) | Delay (ms) | Distance D (km) | Delay (ms) |
| UE: 10° | satellite - UE | 1932.24 | 6.440 | 3647.5 | 12.158 | 14018.16 | 46.727 |
| GW: 5° | satellite - gateway | 2329.01 | 7.763 | 4101.6 | 13.672 | 14539.4 | 48.464 |
| 90° | satellite - UE | 600 | 2 | 1500 | 5 | 10000 | 33.333 |
| Bent pipe satellite | | | | | | | |
| One way delay | Gateway-satellite_UE | 4261.2 | 14.204 | 7749.2 | 25.83 | 28557.6 | 95.192 |
| Round Trip Delay | Twice | 8522.5 | 28.408 | 15498.4 | 51.661 | 57115.2 | 190.38 |
| Regenerative satellite | | | | | | | |
| One way delay | Satellite -UE | 1932.24 | 6.44 | 3647.5 | 12.16 | 14018.16 | 46.73 |
| Round Trip Delay | Satellite-UE-Satellite | 3864.48 | 12.88 | 7295 | 24.32 | 28036.32 | 93.45 |

As non-GEO satellites may revolve at lower altitudes than GEO satellites, their propagation delay (e.g., RTD) may be much shorter than that of a GEO satellite. However, as the revolution period of a non-GEO satellite may be around 2~3 hours, the service-available time (e.g., time when a non-GEO is suitable for communication with a UE on the Earth) is may last for only a few hours at a time. Accordingly, a cell or BS that utilizes a GEO satellite may have a larger coverage area and longer RTD when compared to a non-GEO satellite. However, a BS that utilizes a non-GEO satellite may have a smaller coverage area and a shorter RTD when compared with the BS that utilizes the GEO satellite. Furthermore, a TN cell may have yet the smallest coverage area and the shortest RTD when compared with a NTN cell (e.g., a cell that utilizes a GEO or non-GEO satellite).

Furthermore, in a heterogeneous network (HETNET), operators may also add micro cells to integrate with macro networks to spread traffic loads, widely maintain performance and service quality while reusing spectrum. Accordingly, to take advantage of the HETNET, it may be possible for a UE to receive paging from a serving cell with a larger coverage area (e.g., a cell with coverage over a larger area) and then to switch to a target cell with a smaller coverage area, than the serving cell, to initiate a random access procedure and establish a radio resource control (RRC) connection. Then, after completing the data or signaling transmission under the RRC connection, the UE may revert or redirect back to the serving cell with the larger coverage area than that of the target cell to receive paging.

Accordingly, systems and methods in accordance with various embodiments may describe coverage based reselection or redirection where a UE may receive configuration information from a serving cell with a relatively larger coverage area (e.g., a cell with coverage over a relatively large area when compared with that of a target cell). Then, the UE may switch to a target cell with a smaller coverage area and less propagation delay than that of the serving cell to initiate a random access procedure and establish a radio resource control (RRC) connection. In various embodiments, this may involve a first step where a UE may receive configuration information from the network (NW) side (e.g., from the serving cell). Then, the UE may determine a carrier and/or a target cell for random access based on the configuration from the NW side. In certain embodiments, the UE may initiate a random access procedure or continue with a random access procedure on the target cell.

In various embodiments, initializing the random access procedure or continuing the random access procedure may be based on a two-step random access procedure or a four-step random access procedure.

In various embodiments, the UE may select the target cell or carrier whenever a random access procedure is initiated or whenever a physical random access channel preamble is transmitting.

In various embodiments, initiating a random access procedure may include, for example, one of: a UE transmitting a physical random access channel preamble with or without payload to the target cell and receiving a random access response from the target cell; the UE transmitting a physical random access channel preamble with or without payload in the target uplink carrier and receiving a random access response in the serving downlink carrier; or the UE transmitting a physical random access channel preamble with or without payload in the target uplink carrier and receiving a random access response in the target downlink carrier.

In various embodiments, continuing a random access procedure may include, for example, one of: a UE transmitting a physical random access channel preamble with or without payload to a serving cell, re-transmitting a physical random access channel preamble with or without payload to a target cell and receiving a random access response from the target cell; the UE transmitting a physical random access channel preamble with or without payload in a serving uplink carrier, retransmitting a physical random access channel preamble with or without payload in a targeting uplink carrier and receiving a random access response in a serving downlink carrier or a target downlink carrier; the UE transmitting a physical random access channel preamble with or without payload in the serving uplink carrier and receiving a random access response in the target downlink carrier.

In various embodiments, reference to an assistant cell may refer to a possible target cell for random access after receiving the configuration information from the serving cell. Accordingly, assistant cells may be a collection of cells from which a target cell may be chosen. Also, a target cell may be a type of assistant cell (e.g., an assistant cell that is chosen for random access). In certain embodiments, this assistant cell may be an independent cell to which the UE may be re-directed to or that the UE may reselect to as a target cell. By being an independent cell, the assistant cell (e.g., a possible target cell) may handle network communications with the UE without regard to whether the communications are for uplink or downlink communications.

In further embodiments, an assistant cell may be a supplemental carrier and not an independent cell. By being a supplemental carrier, the assistant cell may be a cell that handles only certain authorized network communications with the UE as selectively offloaded from an original cell (e.g., a primary cell for communications). For example, the assistant cell may be a supplementary uplink (SUL) carrier. The UE may only send uplink (UL) communications with the SUL carrier, while downlink (DL) communications to the UE are handled by another carrier. (e.g., via the original cell). As another example, the assistant cell may be a supplementary DL (SDL) carrier. The UE may only send downlink (DL) communications with the SDL, while UL communications to the UE are handled by another carrier (e.g., via the original cell). As yet another example, the assistant cell may be a SUL carrier and a SDL carrier. The UE may selectively utilize the SUL carrier for certain UL communications and the SDL carrier for certain DL communications.

In certain embodiments, a UE may select a target cell based on information received from a serving cell (e.g., the cell that provides configuration information for a UE). In particular embodiments, this configuration information may include reselection criteria that may be utilized to determine when a UE is to perform reselection to identify a target cell and/or how to identify a target cell. This reselection criteria may be provided via layer 3 (L3) signaling (e.g. system information, a paging message or RRC dedicated signaling), layer 2 (L2) signaling (e.g., within a medium access control (MAC) subheader or a MAC control element (CE)) or layer 1 (L1) signaling (e.g. as part of downlink control information (DCI)). One example of this reselection criteria may include a cell selection receiver level value (e.g., Srxlev) threshold in decibels (dB) used by a UE when reselecting towards a higher priority radio access technology (RAT) or frequency than a current serving frequency for a non-GEO satellite based cell (e.g., $Threshold_{X,HighP}$_NonGEO), a GEO satellite based cell (e.g., $Threshold_{X,HighP}$_GEO), a macro cell (e.g., $Threshold_{X,HighP}$_Macro), and a micro cell (e.g., $Threshold_{X,HighP}$_Micro). Another example of this reselection criteria may include the cell selection quality value (e.g., Squal) threshold in dB used by the UE when reselecting towards a higher priority RAT or frequency than the current serving frequency for a non-GEO satellite based cell (e.g., $Threshold_{X,HighQ}$_Non GEO), a GEO satellite based cell (e.g., $Threshold_{X,HighQ}$_GEO), a macro cell (e.g., $Threshold_{X,HighQ}$_Macro), and a micro cell (e.g., $Threshold_{X,HighQ}$_Micro). Another example of this reselection criteria may include the Srxlev threshold (in dB) used by the UE when reselecting towards a lower priority RAT or frequency than the current serving frequency for a non-GEO satellite based cell (e.g., $Threshold_{X,LowP}$_NonGEO), a GEO satellite based cell (e.g., $Threshold_{X,LowP}$_GEO), a macro cell (e.g., $Threshold_{X,LowP}$_Macro), and a micro cell (e.g., $Threshold_{X,LowP}$_Micro). Another example of this reselection criteria may include the Squal threshold (in dB) used by the UE when reselecting towards a lower priority RAT or frequency than the current serving frequency for a non-GEO satellite based cell (e.g., $Threshold_{X,LowQ}$_NonGEO), a GEO satellite based cell (e.g., $Threshold_{X,LowQ}$_GEO), a macro cell (e.g., $Threshold_{X,LowQ}$_Macro), and a micro cell (e.g., $Threshold_{X,LowQ}$_Micro). Another example of this reselection criteria may include the Squal threshold (in dB) used by the UE on the serving cell when reselecting towards a lower priority RAT or frequency for a non-GEO satellite based cell (e.g., $Threshold_{Serving,LowQ}$_NonGEO), a GEO satellite based cell (e.g., $Threshold_{Serving,LowQ}$_GEO), a macro cell (e.g., $Threshold_{Serving,LowQ}$_Macro), and a micro cell (e.g., $Threshold_{Serving,LowQ}$_Micro). Another example of this reselection criteria may include the Squal threshold (in dB) used by the UE on the serving cell when reselecting towards a higher priority RAT or frequency for a non-GEO satellite based cell (e.g., $Threshold_{Serving,HighQ}$_NonGEO), a GEO satellite based cell (e.g., $Threshold_{Serving,HighQ}$_GEO), a macro cell (e.g., $Threshold_{Serving,HighQ}$_Macro), and a micro cell (e.g., $Threshold_{Serving,HighQ}$_Micro). In various embodiments, this reselection criteria may be provided via layer 3 (L3) signaling (e.g. system information, a paging message or RRC dedicated signaling), layer 2 (L2) signaling (e.g., within a medium access control (MAC) subheader or a MAC control element (CE)) or layer 1 (L1) signaling (e.g. as part of downlink control information (DCI)). Furthermore, the thresholds associated with the reselection criteria can be provided on a per cell or per frequency basis.

In specific embodiments, this configuration information may include, for example, at least one of: a reselection configuration, redirection configurations, a carrier selection configuration, a bandwidth part (BWP) selection configuration; a random access channel (RACH) physical random access channel (PRACH) related configuration for a cell; a timing advance offset or a default timing advance for the cell or the carrier; a control resource set or a search space for the cell, the carrier, or a bandwidth part. In particular embodiments, the reselection configuration may include, for example, at least one of a list containing cell identities, a range of cell identities, a list of cell indexes, an indication of a target type of cells, a reselection priority for the target type of cells, a scaling factor to a reselection priority for the target type of cells, an offset to the reselection priority for the target type of cells, a scaling factor to measurement results for the target type of cells, an offset to the measurement results for the target type of cells, a reselection threshold for the target type of cells, a scaling factor to the reselection threshold for the target type of cells, an offset to the reselection threshold for the target type of cells, a pathloss threshold, and a power budget threshold. In particular embodiments, the redirection configuration may include a cell identity or a cell index. In particular embodiments, the carrier selection configuration may include, for example, at least one of: a RSRP threshold for a second uplink or downlink carrier, a RSRQ threshold for a second uplink or downlink carrier, a SINR threshold for a second uplink or downlink carrier, or a set of uplink and/or downlink carriers. Various aspects of configuration information are discussed in further detail below.

In particular embodiments, this configuration information may include a pathloss threshold that may be utilized to determine when a UE is to perform reselection to identify a target cell/carrier and/or how to identify a target cell/carrier. When UE detects that the pathloss between UE and the serving cell/carrier is less than the pathloss threshold, the UE may then reselect another cell/carrier to initiate a random access procedure. This pathloss threshold may be provided via layer 3 (L3) signaling (e.g. system information, a paging message or RRC dedicated signaling), layer 2 (L2) signaling (e.g., within a medium access control (MAC) subheader or a MAC control element (CE)) or layer 1 (L1) signaling (e.g. as part of downlink control information (DCI)). Furthermore, the pathloss threshold can be provided on a per cell or per frequency basis.

In particular embodiments, configuration information may include a power budget threshold that may be utilized to determine when a UE is to perform reselection to identify a target cell/carrier and/or how to identify a target cell/carrier. One example of the power budget threshold may be a desired reception power of a serving cell. When the maximum transmission power supported by the UE is less than the desired reception power of the serving cell, the UE may reselect another cell/carrier to initiate a random access procedure. This power budget threshold may be provided via layer 3 (L3) signaling (e.g. system information, a paging message or RRC dedicated signaling), layer 2 (L2) signaling (e.g., within a medium access control (MAC) subheader or a MAC control element (CE)) or layer 1 (L1) signaling (e.g. as part of downlink control information (DCI)). Furthermore, the power budget threshold can be provided on a per cell or per frequency basis.

In particular embodiments, an offset for the target type of cell (e.g. non-GEO satellite based cell, GEO satellite based cell, macro cell, micro cell) may be applied to the thresholds associated with the reselection criteria. These offsets may be communicated to the UE via L3 signaling (e.g. system information, paging message or RRC message), layer 2 (L2) signaling (e.g., within a medium access control (MAC) subheader or a MAC control element (CE)) or layer 1 (L1) signaling (e.g. as part of downlink control information (DCI)). Accordingly, the final thresholds for the target cell type=(the current threshold)+offset (e.g., where the offsets are values that may be added to a determined threshold prior to offset application). These offsets can be provided on a per cell or per frequency basis.

In particular embodiments, a scaling factor for the target type of cell (e.g. non-GEO satellite based cell, GEO satellite based cell, macro cell, micro cell) may be applied to the thresholds associated with the reselection criteria. These scaling factors may be communicated to the UE via L3 signaling (e.g. system information, paging message or RRC message), layer 2 (L2) signaling (e.g., within a medium access control (MAC) subheader or a MAC control element (CE)) or layer 1 (L1) signaling (e.g. as part of downlink control information (DCI)). Accordingly, the final thresholds for the target cell type=(the current threshold)*scaling factor (e.g., where the scaling factors are values that may be multiplied with a determined threshold prior to scaling factor application). These scaling factors can be provided on a per cell or per frequency basis.

In certain embodiments, a UE may select a target cell as directed by a serving cell (e.g., the cell that provides configuration information for a UE). In such embodiments, the serving cell may command the UE to select a particular target cell on a UE specific or cell specific basis, as indicated in L3 signaling (e.g. a paging message, system information, RRC message), layer 2 (L2) signaling (e.g., within a medium access control (MAC) subheader or a MAC control element (CE)) or layer 1 (L1) signaling (e.g. as part of downlink control information (DCI)).

In particular embodiments, a UE may determine a target cell based on evaluating measurement results (e.g., based on evaluating assistant cells). These assistant cells may be identified in a list of assistant cells, frequencies in which assistant cells may be located, and/or any other criteria for identification of assistant cells (e.g., parameters, factors, offsets, and the like). For example, an assistant cell list may be sent to a UE via L3 signaling (e.g. in a paging message, system information, RRC message), L2 signaling (e.g., in a MAC subheader or MAC CE), or L1 signaling (e.g. in a DCI). The UE may then determine a target cell from the identified assistant cells based on the measurement results of the assistant cells identified in the provided assistant cell list. In certain embodiments, the assistant cell list may be a list containing cell identifiers or a range of cell identifiers (e.g., cell IDs, or cell identities). In further embodiments, the assistant cell list may be a list containing cell indexes (which may be a proxy for cell identifiers) from neighboring cells, as identifiable in system information.

In particular embodiments, an indication may be sent to a UE via L3 signaling (e.g. as a paging message, system information, RRC message), L2 signaling (e.g., as a MAC subheader or MAC CE), or L1 signaling (e.g. as a DCI). This indication may be to select a target cell that is a non-GEO cell (e.g., selectToNon-GEOcell), to select a target cell that is a GEO cell (e.g., selectToGEOcell), to select a target cell that is a macro cell (e.g., selectToMacrocell), or to select a target cell that is a micro cell (e.g., selectToMicrocell). These selections may be based on reselection priorities and measurement results of neighboring cells which are consistent with the indication (e.g., neighboring non-GEO cells, neighboring GEO cells, neighboring macro cells, or neighboring micro cells).

In certain embodiments, a scaling factor for the target type of cell (e.g. non-GEO satellite based cell, GEO satellite based cell, macro cell, micro cell) that may be applied to a reselection priority may be sent to a UE via L3 signaling (e.g. as a paging message, system information, RRC message), L2 signaling (e.g., as a MAC subheader or MAC CE) or L1 signaling (e.g. as a DCI). Thus, the updated reselection priority=(the existing reselection priority)*scaling factor. Stated another way, the scaling factors are values that may be multiplied with a reselection priority prior to scaling factor application. Thus, a UE may determine a target cell based on the reselection priorities and measurement results. These scaling factors for reselection priority may be provided on a per cell or per frequency basis.

In various embodiments, an offset to a reselection priority for the target type of cell (e.g. non-GEO satellite based cell, GEO satellite based cell, macro cell, micro cell) or a separate or new reselection priority for the target type of cell (e.g. non-GEO satellite based cell, GEO satellite based cell, macro cell, micro cell) may be sent to a UE via L3 signaling (e.g. as a paging message, system information, RRC message), L2 signaling (e.g., as a MAC subheader or MAC CE), or L1 signaling (e.g. as a DCI). This offset or a separate priority may be applied for different types of assistant cells, such as assistant cells that are a non-GEO cell, a GEO cell, a macro cell, or a micro cell. This updated reselection priority=(the existing reselection priority)+offset. Stated another way, the offsets may be values that may be added to a determined—selection priority prior to offset application. Thus, a UE may determine a target cell based on the reselection priorities and measurement results. These offsets for reselection priority may be provided on a per cell or per frequency basis.

In certain embodiments, a scaling factor that may be applied to measurement results may be sent to a UE via L3 signaling (e.g. as a paging message, system information, RRC message), L2 signaling (e.g., as a MAC subheader or MAC CE) or L1 signaling (e.g. as a DCI). This scaling factor may be applied for different types of assistant cells, such as assistant cells that are a non-GEO cell, a GEO cell, a macro cell, or a micro cell. Thus, the updated measurement result= (the existing measurement result)*scaling factor. Stated another way, the scaling factors are values that may be multiplied with measurement results prior to scaling factor application. Thus, a UE may determine a target cell based on the measurement results. For example, the scaling factor may be applied to a measured received signal reference power (RSRP) and/or a reference signal received quality (RSRQ) and/or a signal to interference plus noise ratio (SINR). These scaling factors for measurement results may be provided on a per cell or per frequency basis.

In various embodiments, an offset to a measurement result may be sent to a UE via L3 signaling (e.g. as a paging message, system information, RRC message), L2 signaling (e.g., as a MAC subheader or MAC CE), or L1 signaling (e.g. as a DCI). This offset may be applied for different types of assistant cells, such as assistant cells that are a non-GEO cell, a GEO cell, a macro cell, or a micro cell. This updated measurement result=(the existing measurement result)+offset. Stated another way, the offsets may be values that may be added to a determined measurement result prior to offset application. For example, the offset may be applied to a measured RSRP and/or a RSRQ and/or a SINR. Thus, a UE may determine a target cell based on the measurement result. These offsets for reselection priority may be provided on a per cell or per frequency basis.

In particular embodiments, a target cell may be indicated explicitly in signaling from a NW (e.g., from a serving cell that provides system information) to a UE. Stated another way, a UE may determine a target cell based on an explicit command received from the NW side. The target cell can be configured dynamically or statically. More specifically, by being configured dynamically, the target cell may be indicated in L3 signaling (e.g. a paging message or RRC message) or L2 signaling (e.g., a MAC subheader or MAC CE) or L1 signaling (e.g. a DCI)). Alternatively, the target cell can be configured semi-statically in a system information block (SIB). In various embodiments, a target cell may be indicated via the target cell's cell identifier, or by a cell index from a listing of neighboring cells in system information.

In various embodiments, a UE may search for a target cell or carrier (e.g., frequency for communications, which may be associated with one or more assistant cells) for reselection based on information received from the NW side (e.g., a serving cell). In further embodiments, a UE may send a Message 1 (e.g., a random access preamble) to an indicated target cell and/or carrier as instructed by the NW side (e.g., a serving cell) without searching for the target cell or carrier.

In particular embodiments, an attempt to achieve random access for a target cell may fail. In such situations, a UE may continue (e.g., retry) random access with the target cell or select a new target cell and attempt random access with the new target cell. This new target cell may be, for example, the original serving cell from which the UE received reselection or redirection configuration information or may be another target cell from a collection of assistant cells determined either by the UE or as instructed by the serving cell.

Figure 3A:
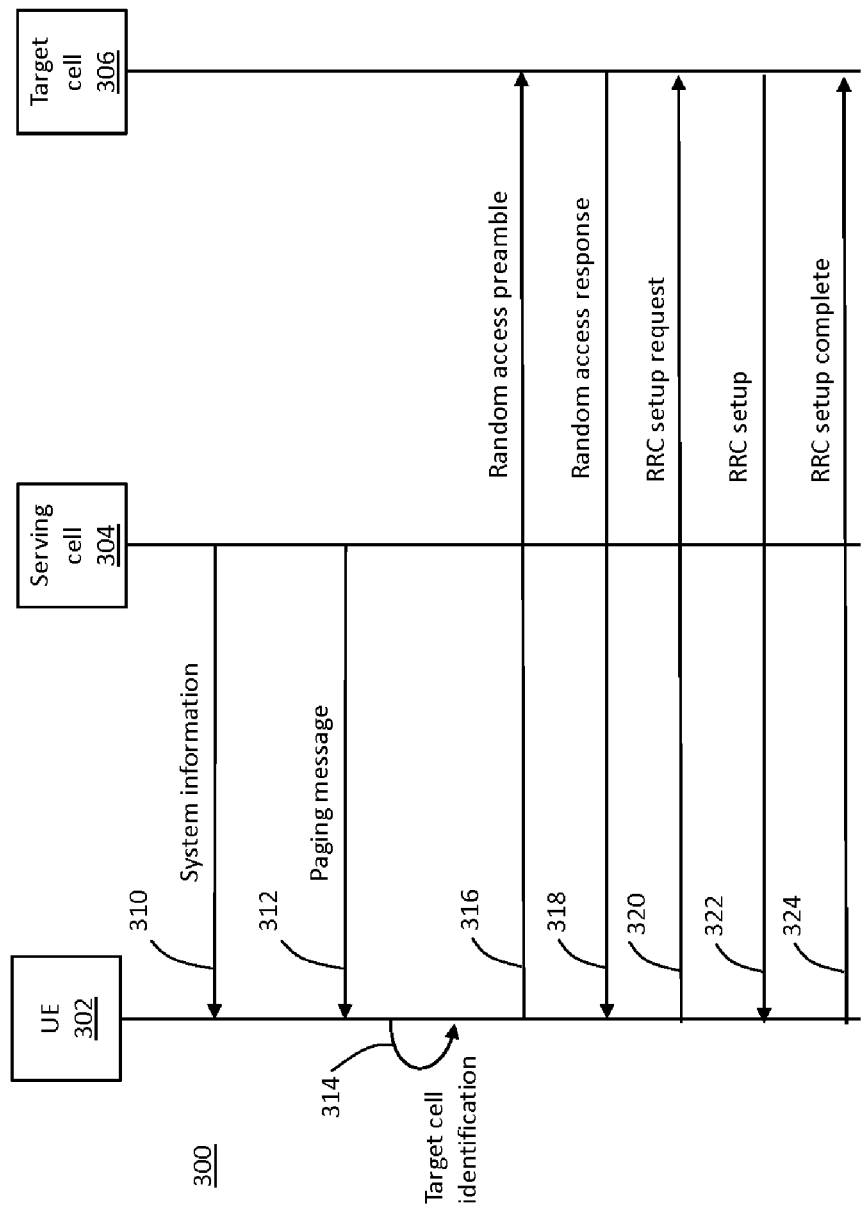
FIG. 3A is a sequence diagram illustrating a network triggered redirection process, in accordance with some embodiments.

FIG. 3A is a sequence diagram illustrating a network triggered redirection process 300, in accordance with some embodiments. The process 300 may be performed by a UE 302, a serving cell 304, and a target cell 306. Also, the process 300 may encompass UE determination (e.g., reselection) of the target cell 306 or network determination (e.g., redirection) of the target cell 306, as will be discussed further below. It is noted that the process 300 is merely an example, and is not intended to limit the present disclosure. Accordingly, it is understood that additional operations (e.g., blocks) may be provided before, during, and after the process 300 of FIG. 3A, certain operations may be omitted, certain operations may be performed concurrently with other operations, and that some other operations may only be briefly described herein.

At operation 310, the serving cell 304 may provide system information to the UE 302. As noted above, the serving cell 304 may be a BS that covers a larger geographic area than the target cell 306. For example, the serving cell 304 may be a macro cell while the target cell 306 may be a micro cell. As another example, the serving cell 304 may utilize a GEO satellite while the target cell 306 may utilize a non-GEO satellite. This system information may indicate a configuration for the UE 302 and/or for the UE's 302 relationship with the network (e.g., be configuration information), with the serving cell 304 and/or the target cell 306 (or assistant cells that are candidates for being a target cell, such as the target cell 406 or a new target cell) as interfaces for the UE to the network.

At operation 312, the serving cell 304 may send a paging message to the UE 302. The paging message may cause the UE 302 to begin a process of determining a target cell to which the UE 302 may participate in further communications This may be triggered by the network seeking to send DL data to the UE 302.

As noted above, in certain embodiments, a UE may determine the target cell 306. To facilitate UE determination of the target cell, the paging message may include a list of assistant cells (e.g., an assistant cell list) for the UE to re-select to and to which the UE may initiate random access.

Also, as noted above, in particular embodiments, the network may determine the target cell 306. In such embodiments, the paging message may include a target cell identifier to which the UE may initiate random access. In particular embodiments, this paging message with the target cell identity may be located in L1 signaling (e.g., a DCI).

At operation 314, the UE 302 may identify the target cell. As noted above, this target cell may be identified based on whether the UE 302 determines the target cell 306 or whether the network determines the target cell 306.

In embodiments where the UE determines the target cell, the UE may identify the target cell 306 based on the reselection priority and measurement results from cells on the assistant cell list. As noted above, this reselection priority may be with or without application of an offset or scaling factor or a separate value and these measurement results may be, for example, an RSRP, RSRQ, SINR, and/or any other measurement results, with or without application of an offset or scaling factor, from which a target cell may be identified from the assistant cell list.

In embodiments where the network determines the target cell, the UE may identify the target cell 306 based on the cell identifier provided by the serving cell 304. More specifically, the UE may equate the target cell 306 as the cell associated with the cell identifier provided by the serving cell 304. Accordingly, in contrast with embodiments where the UE 302 determines the target cell, here the UE 302 merely executes a command from the serving cell 304 to perform random access toward the target cell 306 as identified by the serving cell 304.

At operation 316, the UE 302 may send a random access preamble to the target cell 306. This random access preamble may be an initial Message 1 in random access. Transmission of this random access preamble may indicate to the target cell 306 that the UE 302 is seeking to perform random access to the target cell 306.

At operation 318, the target cell 306 may send a random access response to the UE 302. In various embodiments, the transmission of a random access response may indicate that the UE 302 was successful in achieving random access with the target cell 306. In certain embodiments, this random access response may be referred to as a Message 2 of random access. In particular embodiments, random access may also include a scheduled transmission message sent from the UE 302 to the target cell 306 (also known as a Message 3 of random access) and a contention resolution message sent from the target cell 306 to the UE 302 (also known as a Message 4 of random access).

At operation 320, due to successful random access with the target cell 306, the UE 302 may set up data communications with the target cell 306 by sending a RRC setup request to the target cell 306.

At operation 322, the target cell 306 may send a RRC setup message to the UE 302. The RRC setup message may set up RRC at the UE 302 for continued communications between the UE 302 and the target cell 306.

At operation 324, the UE 302 may send a RRC setup complete message to the target cell 306. The RRC setup complete message may inform the target cell 306 that RRC setup is complete so that the target cell 306 may begin to send DL data to the UE 302 from the network.

FIG. 3B is a sequence diagram illustrating a network triggered redirection process 330 where random access toward a target cell is retried upon random access failure, in accordance with some embodiments. The process 330 may be performed by the UE 302, the serving cell 304, and the target cell 306. It is noted that the process 330 is merely an example, and is not intended to limit the present disclosure. Accordingly, it is understood that additional operations (e.g., blocks) may be provided before, during, and after the process 330 of FIG. 3B, certain operations may be omitted, certain operations may be performed concurrently with other operations, and that some other operations may only be briefly described herein. Operations 310, 312, and 314 will be the same as that noted above in connection with FIG. 3A and will not be repeated here for brevity.

In certain embodiments, process 330 may be performed by a network triggered redirection process with UE 302 determination (e.g., reselection) of the target cell 306. However, in other embodiments this process 330 may be performed by a network triggered redirection process with network determination (e.g., redirection) of the target cell.

At operation 332, a random access failure may occur between the UE 302 and the target cell 306. This random access failure may refer, for example, to the UE 302 sending a random access preamble but where the UE 302 does not receive a random access response from the target cell 306. In other embodiments, the UE 302 may receive a random access response from the target cell 306 that indicates that random access has failed.

At operation 334, the UE 302 may retry random access toward the target cell 306 again by sending a subsequent random access preamble toward the target cell 306. This subsequent random access preamble may be a reattempt by the UE 302 to achieve random access with the target cell 306.

At operation 336, the target cell 306 may send a random access response to the UE 302. In various embodiments, the transmission of a random access response may indicate that the UE 302 was successful in achieving random access with the target cell 306. In certain embodiments, this random access response may be referred to as a Message 2 of random access. In particular embodiments, random access may also include a scheduled transmission message sent from the UE 302 to the target cell 306 (also known as a Message 3 of random access) and a contention resolution message sent from the target cell 306 to the UE 302 (also known as a Message 4 of random access).

In particular embodiments, due to successful random access with the target cell 306, the UE may then set up data communications with the target cell 306. As noted above, this may include sending a RRC setup request to the target cell 306 (similar to operation 320 of FIG. 3A), having the target cell 306 send a RRC setup message to the UE 302 (similar to operation 322 of FIG. 3A) and having the UE 302 send a RRC setup complete message to the target cell 306 (similar to operation 324 of FIG. 3A).

FIG. 3C is a sequence diagram illustrating a network triggered redirection process 340 where random access toward a serving cell is performed upon random access failure, in accordance with some embodiments. The process 340 may be performed by the UE 302, the serving cell 304, and the target cell 306. It is noted that the process 340 is merely an example, and is not intended to limit the present disclosure. Accordingly, it is understood that additional operations (e.g., blocks) may be provided before, during, and after the process 340 of FIG. 3C, certain operations may be omitted, certain operations may be performed concurrently with other operations, and that some other operations may only be briefly described herein. Operations 310, 312, and 314 will be the same as that noted above in connection with FIG. 3A and will not be repeated here for brevity.

In certain embodiments, process 340 may be performed by a network triggered redirection process with network determination (e.g., redirection) of the target cell. However, in other embodiments this process 340 may be performed by a network triggered redirection process with UE 302 determination (e.g., reselection) of the target cell 306.

At operation 332, a random access failure may occur between the UE 302 and the target cell 306. This random access failure may refer, for example, to the UE 302 sending a random access preamble but where the UE 302 does not receive a random access response from the target cell 306. In other embodiments, the UE 302 may receive a random access response from the target cell 306 that indicates that random access has failed.

At operation 342, the UE 302 may attempt random access toward the serving cell 304 by sending a subsequent random access preamble toward the serving cell 304. This subsequent random access preamble may be an attempt by the UE 302 to achieve random access with the serving cell 304.

At operation 344, the serving cell 304 may send a random access response to the UE 302. In various embodiments, the transmission of a random access response may indicate that the UE 302 was successful in achieving random access with the serving cell 304. In certain embodiments, this random access response may be referred to as a Message 2 of random access. In particular embodiments, random access may also include a scheduled transmission message sent from the UE 302 to the serving cell 304 (also known as a Message 3 of random access) and a contention resolution message sent from the serving cell 304 to the UE 302 (also known as a Message 4 of random access).

In particular embodiments, due to successful random access with the serving cell 304, the UE may then set up data communications with the serving cell 304. As noted above, this may include sending a RRC setup request to the serving cell 304 (similar to operation 320 of FIG. 3A but with the serving cell 304 instead of the target cell 306), having the serving cell 304 send a RRC setup message to the UE 302 (similar to operation 322 of FIG. 3A but with the serving cell 304 instead of the target cell 306) and having the UE 302 send a RRC setup complete message to the serving cell 304 (similar to operation 324 of FIG. 3A but with the serving cell 304 instead of the target cell 306).

FIG. 3D is a sequence diagram illustrating a network triggered redirection process 350 where random access toward a new target cell is performed upon random access failure, in accordance with some embodiments. The process 350 may be performed by the UE 302, the serving cell 304, the target cell 306, and a new target cell 308. It is noted that the process 350 is merely an example, and is not intended to limit the present disclosure. Accordingly, it is understood that additional operations (e.g., blocks) may be provided before, during, and after the process 350 of FIG. 3D, certain operations may be omitted, certain operations may be performed concurrently with other operations, and that some other operations may only be briefly described herein. Operations 310, 312, and 314 will be the same as that noted above in connection with FIG. 3A and will not be repeated here for brevity.

In certain embodiments, process 340 may be performed by a network triggered redirection process with network determination (e.g., redirection) of the target cell. However, in other embodiments this process 340 may be performed by a network triggered redirection process with UE 302 determination (e.g., reselection) of the target cell 306.

At operation 332, a random access failure may occur between the UE 302 and the target cell 306. This random access failure may refer, for example, to the UE 302 sending a random access preamble but where the UE 302 does not receive a random access response from the target cell 306. In other embodiments, the UE 302 may receive a random access response from the target cell 306 that indicates that random access has failed.

At operation 352, the UE 302 may identify a new target cell 308. This new target cell may be identified in a manner similar to operation 314 where target cell may be identified by the UE 302. For example, the UE may identify new target cell 308 on measurement results from cells on the assistant cell list. In certain embodiments, this assistant cell list may be a modified assistant cell list that does not include the target cell 306 to which random access had previously failed. As noted above, these measurement results may be, for example, an RSRP, RSRQ, SINR, and/or any other measurement results, with or without application of an offset or scaling factor, from which a target cell may be identified from the assistant cell list.

At operation 354, the UE 302 may attempt random access toward the new target cell 308 by sending a subsequent random access preamble toward the new target cell 308. This subsequent random access preamble may be an attempt by the UE 302 to achieve random access with the new target cell 308.

At operation 356, the new target cell 308 may send a random access response to the UE 302. In various embodiments, the transmission of a random access response may indicate that the UE 302 was successful in achieving random access with the new target cell 308. In certain embodiments, this random access response may be referred to as a Message 2 of random access. In particular embodiments, random access may also include a scheduled transmission message sent from the UE 302 to the new target cell 308 (also known as a Message 3 of random access) and a contention resolution message sent from the new target cell 308 to the UE 302 (also known as a Message 4 of random access).

In particular embodiments, due to successful random access with the new target cell 308, the UE may then set up data communications with the new target cell 308. As noted above, this may include sending a RRC setup request to the new target cell 308 (similar to operation 320 of FIG. 3A but with the new target cell 308 instead of the target cell 306), having the new target cell 308 send a RRC setup message to the UE 302 (similar to operation 322 of FIG. 3A but with the new target cell 308 instead of the target cell 306) and having the UE 302 send a RRC setup complete message to the new target cell 308 (similar to operation 324 of FIG. 3A but with the new target cell 308 instead of the target cell 306).

Figure 4A:
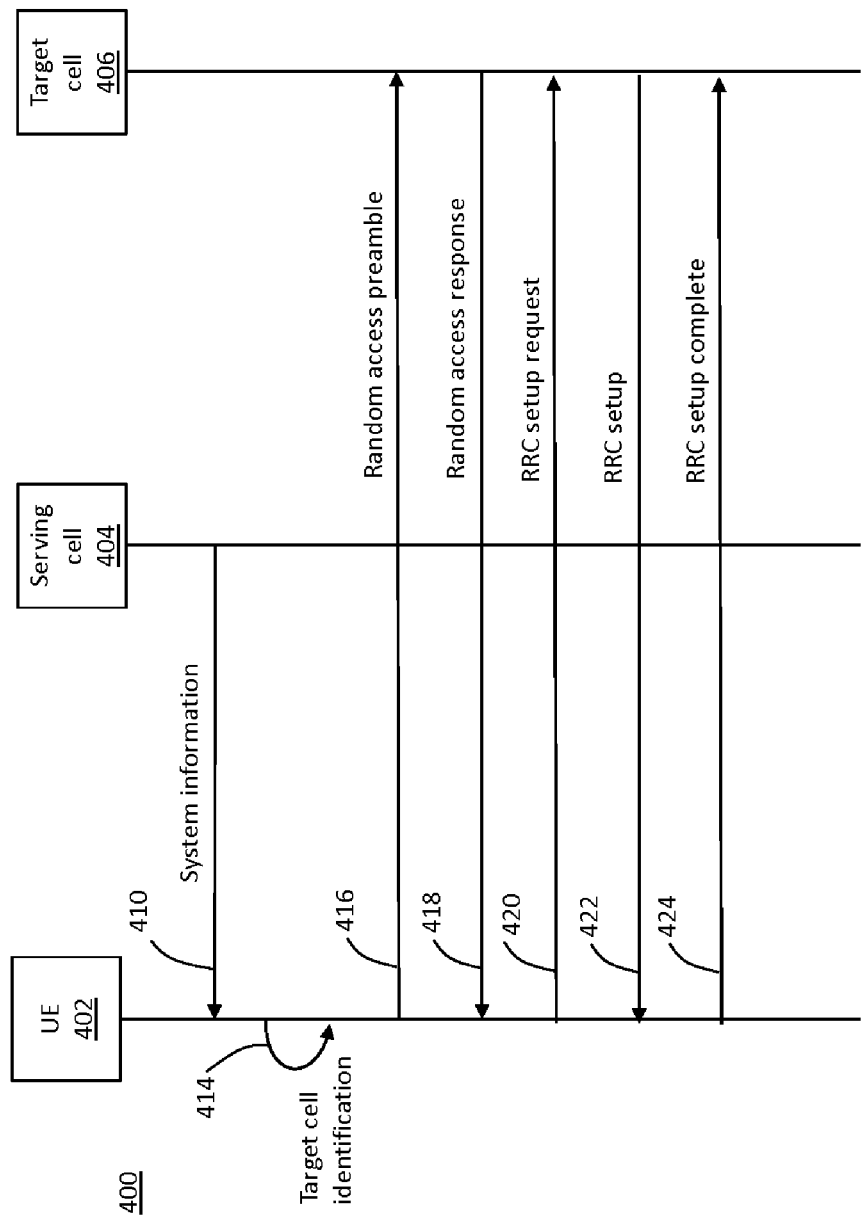
FIG. 4A is a sequence diagram illustrating a UE triggered reselection process, in accordance with some embodiments.

FIG. 4A is a sequence diagram illustrating a UE triggered reselection process 400, in accordance with some embodiments. The process 400 may be performed by a UE 402, a serving cell 404, and a target cell 406. Also, the process 400 may encompass UE determination (e.g., reselection) of the target cell 406. It is noted that the process 400 is merely an example, and is not intended to limit the present disclosure. Accordingly, it is understood that additional operations (e.g., blocks) may be provided before, during, and after the process 400 of FIG. 4A, certain operations may be omitted, certain operations may be performed concurrently with other operations, and that some other operations may only be briefly described herein.

At operation 410, the serving cell 404 may provide system information to the UE 402. As noted above, the serving cell 404 may be a BS that covers a larger geographic area than the target cell 406. For example, the serving cell 404 may be a macro cell while the target cell 406 may be a micro cell. As another example, the serving cell 404 may utilize a GEO satellite while the target cell 406 may utilize a non-GEO satellite. This system information may be configuration information for the UE 402 and/or for the UE's 402 relationship with the network, with the serving cell 404 and/or the target cell 406 (or assistant cells that are candidates for being a target cell, which may be the target cell 406 or a new target cell) as interfaces for the UE 402 to the network.

As noted above, in certain embodiments, the system information may include a reselection criteria that may be utilized to determine when a UE is to perform reselection to identify a target cell and/or how to identify a target cell. This reselection criteria may be included in a system information block (SIB). One example of this reselection criteria may include a cell selection receiver level value (e.g., Srxlev) threshold in decibels (dB) used by a UE when reselecting towards a higher priority radio access technology (RAT)/ frequency than a current serving frequency for a non-GEO satellite based cell (e.g., $\text{Threshold}_{X,HighP}$_NonGEO), a GEO satellite based cell (e.g., $\text{Threshold}_{X,HighP}$_GEO), a macro cell (e.g., $\text{Threshold}_{X,HighP}$_Macro), and a micro cell (e.g., $\text{Threshold}_{X,HighP}$_Micro). Another example of this reselection criteria may include the cell selection quality value (e.g., Squal) threshold in dB used by the UE when reselecting towards a higher priority RAT/frequency than the current serving frequency for a non-GEO satellite based cell (e.g., $\text{Threshold}_{X,HighQ}$_Non GEO), a GEO satellite based cell (e.g., $\text{Threshold}_{X,HighQ}$_GEO), a macro cell (e.g., $\text{Threshold}_{X,HighQ}$_Macro), and a micro cell (e.g., $\text{Threshold}_{X,HighQ}$_Micro). Another example of this reselection criteria may include the Srxlev threshold (in dB) used by the UE when reselecting towards a lower priority RAT/ frequency than the current serving frequency for a non-GEO satellite based cell (e.g., $\text{Threshold}_{X,LowP}$_NonGEO), a GEO satellite based cell (e.g., $\text{Threshold}_{X,LowP}$_GEO), a macro cell (e.g., $\text{Threshold}_{X,LowP}$_Macro), and a micro cell (e.g., $\text{Threshold}_{X,LowP}$_Micro). Another example of this reselection criteria may include the Squal threshold (in dB) used by the UE when reselecting towards a lower priority RAT/ frequency than the current serving frequency for a non-GEO satellite based cell (e.g., $\text{Threshold}_{X,LowQ}$_NonGEO), a GEO satellite based cell (e.g., $\text{Threshold}_{X,LowQ}$_GEO), a macro cell (e.g., $\text{Threshold}_{X,LowQ}$_Macro), and a micro cell (e.g., $\text{Threshold}_{X,LowQ}$_Micro). Another example of this reselection criteria may include the Squal threshold (in dB) used by the UE on the serving cell when reselecting towards a lower priority RAT/frequency for a non-GEO satellite based cell (e.g., $\text{Threshold}_{Serving,LowQ}$_NonGEO), a GEO satellite based cell (e.g., $\text{Threshold}_{Serving,LowQ}$_GEO), a macro cell (e.g., $\text{Threshold}_{Serving,LowQ}$_Macro), and a micro cell (e.g., $\text{Threshold}_{Serving,LowQ}$_Micro). Another example of this reselection criteria may include the Squal threshold (in dB) used by the UE on the serving cell when reselecting towards a higher priority RAT/frequency for a non-GEO satellite based cell (e.g., $\text{Threshold}_{Serving,HighQ}$_NonGEO), a GEO satellite based cell (e.g., $\text{Threshold}_{Serving,HighQ}$_GEO), a macro cell (e.g., $\text{Threshold}_{Serving,HighQ}$_Macro), and a micro cell (e.g., $\text{Threshold}_{Serving,HighQ}$_Micro). In various embodiments, this reselection criteria may be provided via layer 3 (L3) signaling (e.g. system information, a paging message or RRC message), layer 2 (L2) signaling (e.g., within a medium access control (MAC) subheader or a MAC control element (CE)) or layer 1 (L1) signaling (e.g. as part of downlink control information (DCI)). Furthermore, the thresholds associated with the reselection criteria can be provided on a per cell or per frequency basis.

At operation 414, the UE 402 may identify the target cell when the UE 402 has UL data to send to the network. Then, the UE may identify the target cell 406 for random access based on the reselection criteria received in system information. In certain embodiments, the UE may identify the target cell 406 based on reselection priority and measurement results from cells that meet the reselection criteria. For example, this reselection priority may be with or without application of an offset or scaling factor or a separate value and these measurement results may be, for example, an RSRP, RSRQ, SINR, and/or any other measurement results, with or without application of an offset or scaling factor, from which a target cell may be identified from a list of assistant cells.

At operation 416, the UE 402 may send a random access preamble to the target cell 406. This random access preamble may be an initial Message 1 in random access. Transmission of this random access preamble may indicate to the target cell 406 that the UE 402 is seeking to perform random access to the target cell 406.

At operation 418, the target cell 406 may send a random access response to the UE 402. In various embodiments, the transmission of a random access response may indicate that the UE 402 was successful in achieving random access with the target cell 406. In certain embodiments, this random access response may be referred to as a Message 2 of random access. In particular embodiments, random access may also include a scheduled transmission message sent from the UE 402 to the target cell 406 (also known as a Message 3 of random access) and a contention resolution message sent from the target cell 406 to the UE 402 (also known as a Message 4 of random access).

At operation 420, due to successful random access with the target cell 406, the UE 402 may set up data communications with the target cell 406 by sending a RRC setup request to the target cell 406.

At operation 422, the target cell 406 may send a RRC setup message to the UE 402. The RRC setup message may set up RRC at the UE 402 for continued communications between the UE 402 and the target cell 406.

At operation 424, the UE 402 may send a RRC setup complete message to the target cell 406. The RRC setup complete message may inform the target cell 406 that RRC setup is complete so that the UE 402 may begin to send UL data to the target cell 406.

Figure 4B:
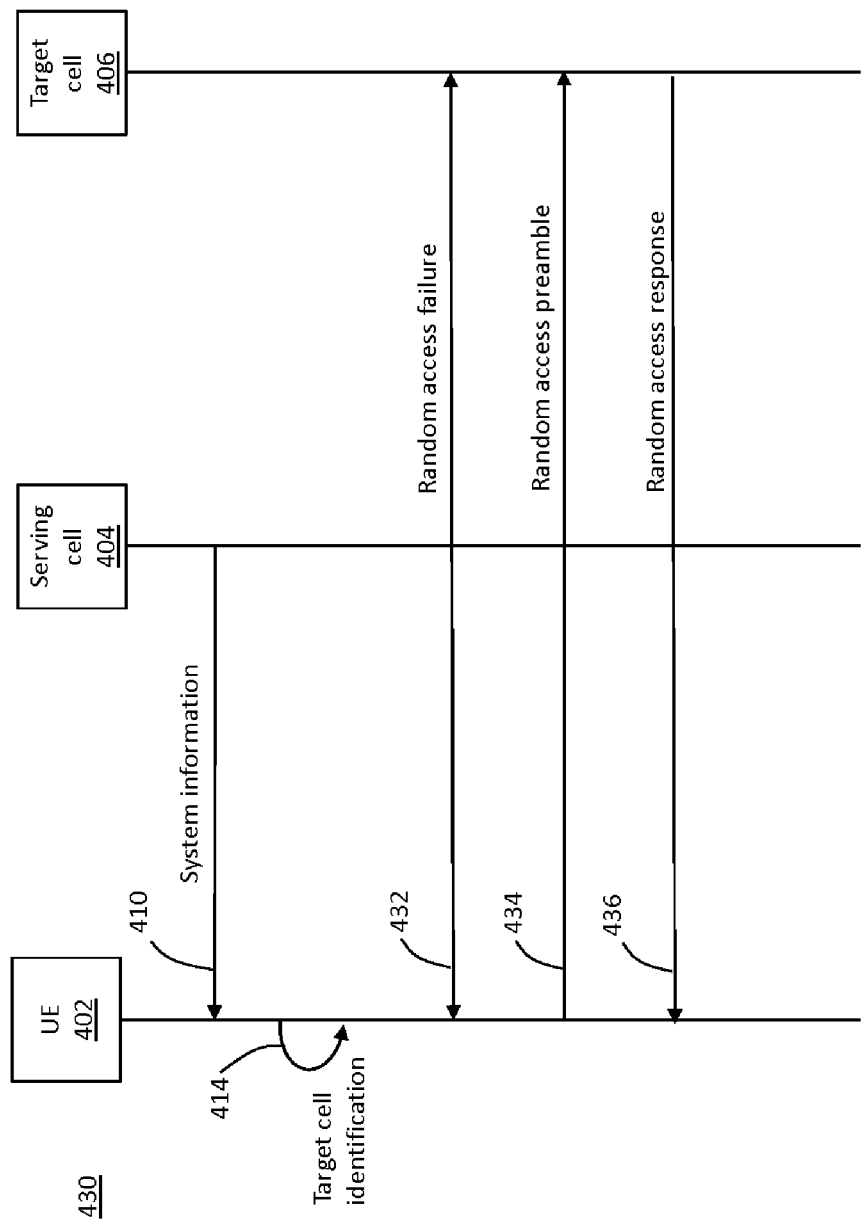
FIG. 4B is a sequence diagram illustrating a UE triggered reselection process where random access toward a target cell is retried upon random access failure, in accordance with some embodiments.

FIG. 4B is a sequence diagram illustrating a UE triggered reselection process 430 where random access toward a target cell is retried upon random access failure, in accordance with some embodiments. The process 430 may be performed by the UE 402, the serving cell 404, and the target cell 406. It is noted that the process 430 is merely an example, and is not intended to limit the present disclosure. Accordingly, it is understood that additional operations (e.g., blocks) may be provided before, during, and after the process 430 of FIG. 4B, certain operations may be omitted, certain operations may be performed concurrently with other operations, and that some other operations may only be briefly described herein. Operations 410, 412, and 414 will be the same as that noted above in connection with FIG. 4A and will not be repeated here for brevity.

At operation 432, a random access failure may occur between the UE 402 and the target cell 406. This random access failure may refer, for example, to the UE 402 sending a random access preamble but where the UE 402 does not receive a random access response from the target cell 406. In other embodiments, the UE 402 may receive a random access response from the target cell 406 that indicates that random access has failed.

At operation 434, the UE 402 may retry random access toward the target cell 406 again by sending a subsequent random access preamble toward the target cell 406. This subsequent random access preamble may be a reattempt by the UE 402 to achieve random access with the target cell 406.

At operation 436, the target cell 406 may send a random access response to the UE 402. In various embodiments, the transmission of a random access response may indicate that the UE 402 was successful in achieving random access with the target cell 406. In certain embodiments, this random access response may be referred to as a Message 2 of random access. In particular embodiments, random access may also include a scheduled transmission message sent from the UE 402 to the target cell 406 (also known as a Message 3 of random access) and a contention resolution message sent from the target cell 406 to the UE 402 (also known as a Message 4 of random access).

In particular embodiments, due to successful random access with the target cell 406, the UE may then set up data communications with the target cell 406. As noted above, this may include sending a RRC setup request to the target cell 406 (similar to operation 420 of FIG. 4A), having the target cell 406 send a RRC setup message to the UE 402 (similar to operation 422 of FIG. 4A) and having the UE 402 send a RRC setup complete message to the target cell 406 (similar to operation 424 of FIG. 4A).

Figure 4C:
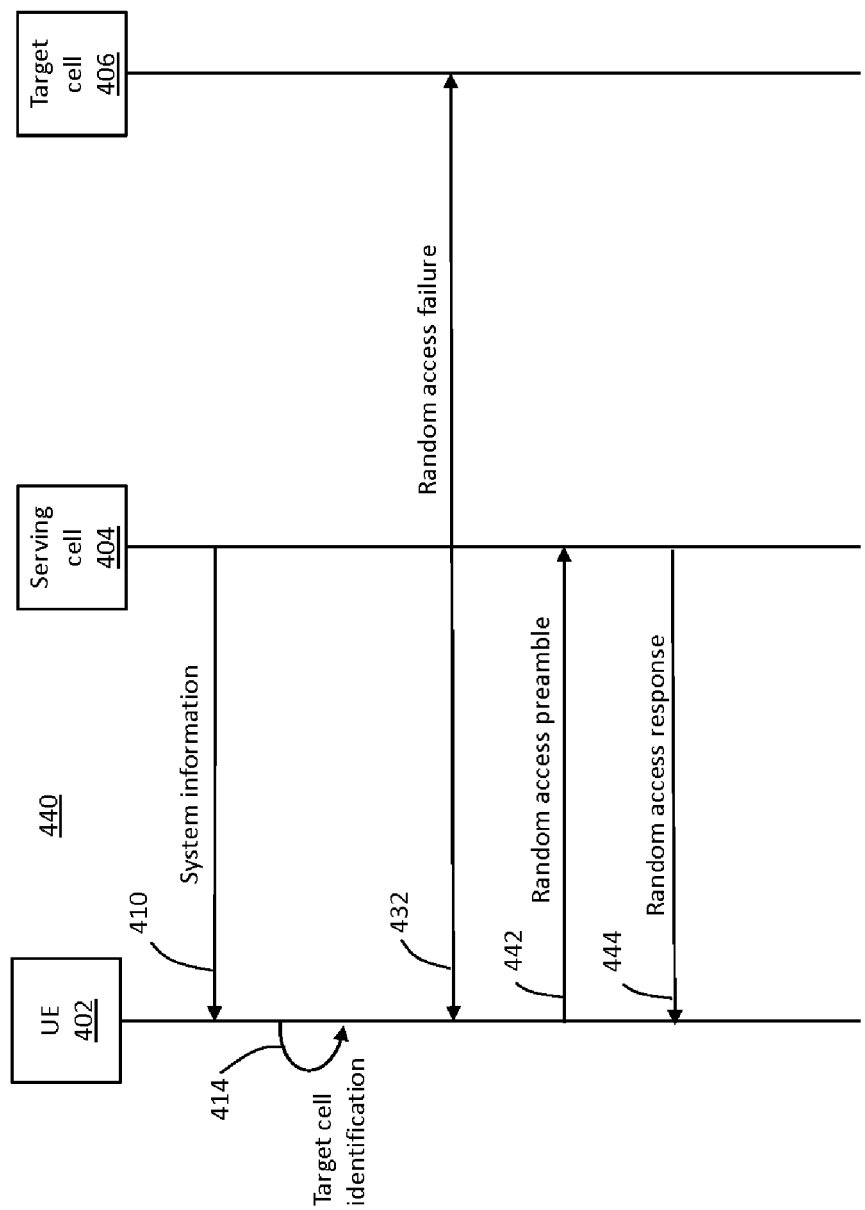
FIG. 4C is a sequence diagram illustrating a UE triggered reselection process where random access toward a serving cell is performed upon random access failure, in accordance with some embodiments.

FIG. 4C is a sequence diagram illustrating a UE triggered reselection process 440 where random access toward a serving cell is performed upon random access failure, in accordance with some embodiments. The process 440 may be performed by the UE 402, the serving cell 404, and the target cell 406. It is noted that the process 440 is merely an example, and is not intended to limit the present disclosure. Accordingly, it is understood that additional operations (e.g., blocks) may be provided before, during, and after the process 440 of FIG. 4C, certain operations may be omitted, certain operations may be performed concurrently with other operations, and that some other operations may only be briefly described herein. Operations 410, 412, and 414 will be the same as that noted above in connection with FIG. 4A and will not be repeated here for brevity.

At operation 432, a random access failure may occur between the UE 402 and the target cell 406. This random access failure may refer, for example, to the UE 402 sending a random access preamble but where the UE 402 does not receive a random access response from the target cell 406. In other embodiments, the UE 402 may receive a random access response from the target cell 406 that indicates that random access has failed.

At operation 442, the UE 402 may attempt random access toward the serving cell 404 by sending a subsequent random access preamble toward the serving cell 404. This subsequent random access preamble may be an attempt by the UE 402 to achieve random access with the serving cell 404.

At operation 444, the serving cell 404 may send a random access response to the UE 402. In various embodiments, the transmission of a random access response may indicate that the UE 402 was successful in achieving random access with the serving cell 404. In certain embodiments, this random access response may be referred to as a Message 2 of random access. In particular embodiments, random access may also include a scheduled transmission message sent from the UE 402 to the serving cell 404 (also known as a Message 3 of random access) and a contention resolution message sent from the serving cell 404 to the UE 402 (also known as a Message 4 of random access).

In particular embodiments, due to successful random access with the serving cell 404, the UE may then set up data communications with the serving cell 404. As noted above, this may include sending a RRC setup request to the serving cell 404 (similar to operation 420 of FIG. 4A but with the serving cell 404 instead of the target cell 406), having the serving cell 404 send a RRC setup message to the UE 402 (similar to operation 422 of FIG. 4A but with the serving cell 404 instead of the target cell 406) and having the UE 402 send a RRC setup complete message to the serving cell 404 (similar to operation 424 of FIG. 4A but with the serving cell 404 instead of the target cell 406).

Figure 4D:
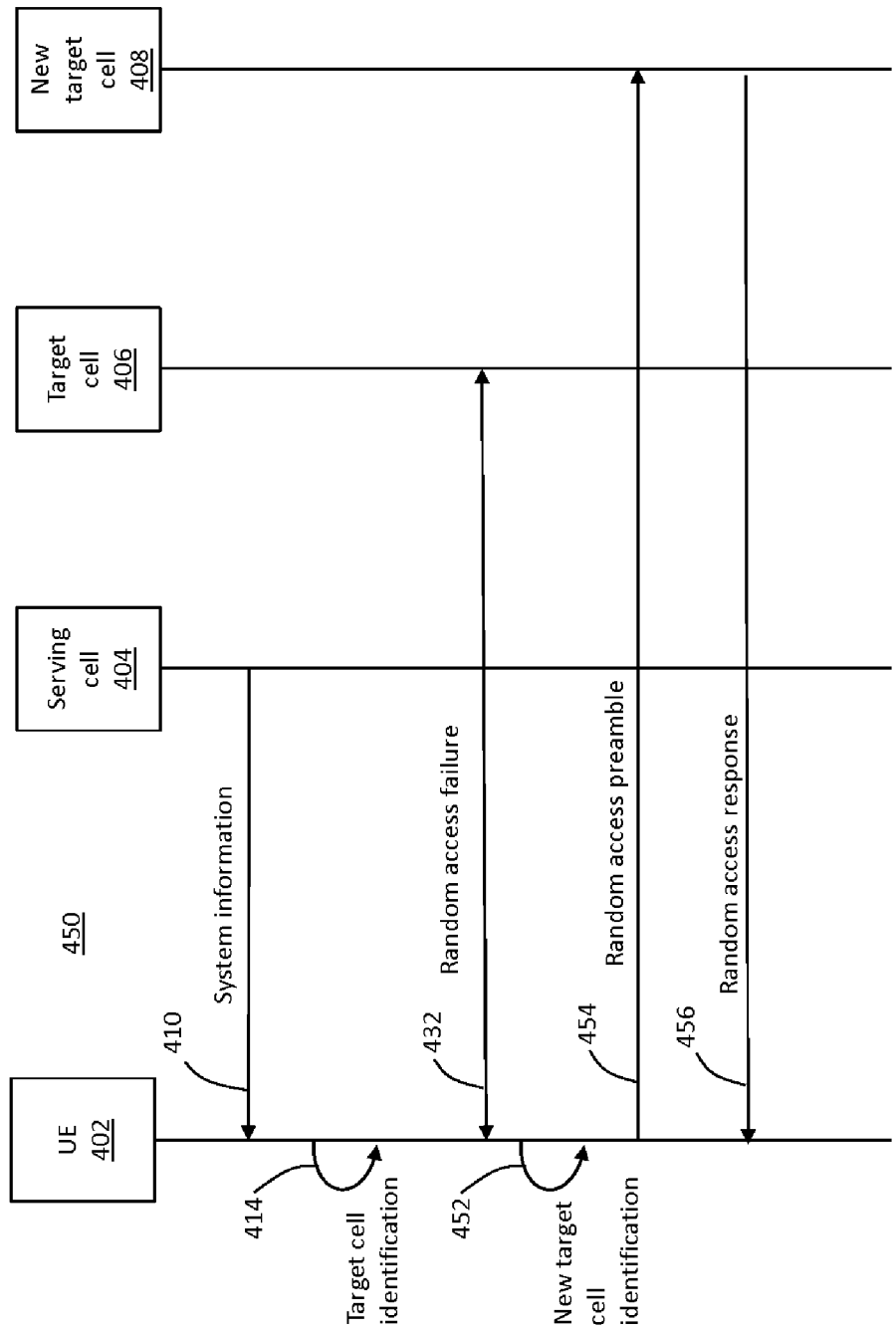
FIG. 4D is a sequence diagram illustrating a UE triggered reselection process where random access toward a new target cell is performed upon random access failure, in accordance with some embodiments.

FIG. 4D is a sequence diagram illustrating a UE triggered reselection process 450 where random access toward a new target cell is performed upon random access failure, in accordance with some embodiments. The process 450 may be performed by the UE 402, the serving cell 404, the target cell 406, and a new target cell 408. It is noted that the process 450 is merely an example, and is not intended to limit the present disclosure. Accordingly, it is understood that additional operations (e.g., blocks) may be provided before, during, and after the process 450 of FIG. 4D, certain operations may be omitted, certain operations may be performed concurrently with other operations, and that some other operations may only be briefly described herein. Operations 410, 412, and 414 will be the same as that noted above in connection with FIG. 4A and will not be repeated here for brevity.

At operation 432, a random access failure may occur between the UE 402 and the target cell 406. This random access failure may refer, for example, to the UE 402 sending a random access preamble but where the UE 402 does not receive a random access response from the target cell 406. In other embodiments, the UE 402 may receive a random access response from the target cell 406 that indicates that random access has failed.

At operation 452, the UE 402 may identify a new target cell 408. This new target cell may be identified in a manner similar to operation 414 where target cell may be identified by the UE 402. For example, the UE may identify new target cell 408 on reselection priority and measurement results from cells (e.g., assistant cells) other than the target cell 406 to which random access had previously failed. As noted above, this reselection priority may be with or without application of an offset or scaling factor or a separate value and these measurement results may be, for example, an RSRP, RSRQ, SINR, and/or any other measurement results, with or without application of an offset or scaling factor, from which a target cell may be identified.

At operation 454, the UE 402 may attempt random access toward the new target cell 408 by sending a subsequent random access preamble toward the new target cell 408. This subsequent random access preamble may be an attempt by the UE 402 to achieve random access with the new target cell 408.

At operation 456, the new target cell 408 may send a random access response to the UE 402. In various embodiments, the transmission of a random access response may indicate that the UE 402 was successful in achieving random access with the new target cell 408. In certain embodiments, this random access response may be referred to as a Message 2 of random access. In particular embodiments, random access may also include a scheduled transmission message sent from the UE 402 to the new target cell 408 (also known as a Message 3 of random access) and a contention resolution message sent from the new target cell 408 to the UE 402 (also known as a Message 4 of random access).

In particular embodiments, due to successful random access with the new target cell 408, the UE may then set up data communications with the new target cell 408. As noted above, this may include sending a RRC setup request to the new target cell 408 (similar to operation 420 of FIG. 4A but with the new target cell 408 instead of the target cell 406), having the new target cell 408 send a RRC setup message to the UE 402 (similar to operation 422 of FIG. 4A but with the new target cell 408 instead of the target cell 406) and having the UE 402 send a RRC setup complete message to the new target cell 408 (similar to operation 424 of FIG. 4A but with the new target cell 408 instead of the target cell 406).

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a communication device, comprising:
receiving configuration information from a first communication node, wherein the first communication node is part of a first cell or a first carrier, wherein the configuration information comprises information related to a random access channel related configuration for a second cell or a second carrier;
determining a second communication node based on the configuration information, wherein the second communication node is part of the second cell or the second carrier; and
initializing a random access procedure or continuing with the random access procedure on the second communication node.

2. The method of claim 1, wherein the initializing the random access procedure comprises one of:
sending a physical random access channel preamble to the second communication node; or
sending a physical random access channel preamble and payload to the second communication node.

3. The method of claim 1, wherein continuing the random access procedure comprises one of:
transmitting a physical random access channel preamble to the first communication node and receiving a random access response from the second communication node;
transmitting the physical random access channel preamble and a payload to the first communication node and receiving the random access response from the second communication node;
retransmitting the physical random access channel preamble to the second communication node and receiving the random access response from the first communication node or the second communication node; or
retransmitting the physical random access channel preamble and the payload to the second communication node and receiving the random access response from the first communication node or the second communication node.

4. The method of claim 1, wherein the initializing the random access procedure or continuing the random access procedure is based on a two-step random access procedure or a four-step random access procedure.

5. The method of claim 1, wherein the configuration information comprises information related to at least one of:
a reselection configuration;
a redirection configuration;
a carrier selection configuration;
a bandwidth part (BWP) selection configuration;
a timing advance offset or a default timing advance for the cell or the carrier; or
a control resource set or a search space for the cell, the carrier, or a bandwidth part.

6. The method of claim 1, further comprising determining the second communication node is based on at least one of:
a cell reselection configuration;
a cell redirection configuration
a determined set of uplink and downlink carriers; or
a failure type of a past random access procedure.

7. The method of claim 1, further comprising:
selecting the second communication node when the random access procedure is initialized or when a physical random access channel preamble is transmitting.

8. The method of claim 1, further comprising:
sending a subsequent random access preamble to the second communication node based on a failure to achieve random access with the second communication node from the random access procedure.

9. The method of claim 1, further comprising:
initializing a subsequent random access procedure to the first communication node based on a failure to achieve random access with the second communication node.

10. The method of claim 1, further comprising:
initializing a subsequent random access procedure to a third communication node based on a failure to achieve random access with the second communication node.

11. The method of claim 1, further comprising:
sending a radio resource control setup request to the second communication node.

12. The method of claim 1, wherein the first communication node has a longer round trip time relative to the communication device than the second communication node.

13. The method of claim 1, wherein the first cell has a larger coverage area than that of the second cell.

14. A non-transitory computer-readable medium having stored thereon computer-executable instructions which when executed by at least one processor, causes the at least one processor to carry out the steps of:
receiving configuration information from a first communication node, wherein the first communication node is part of a first cell or a first carrier, wherein the configuration information comprises information related to a random access channel related configuration for a second cell or a second carrier;
determining a second communication node based on the configuration information, wherein the second communication node is part of the second cell or the second carrier; and
initializing a random access procedure or continuing with the random access procedure on the second communication node.

15. A communication device, comprising:
a receiver configured to:
receive configuration information from a first communication node, wherein the first communication node is part of a first cell or a first carrier, wherein the configuration information comprises information related to a random access channel related configuration for a second cell or a second carrier; and
a processor configured to:
determine a second communication node based on the configuration information, wherein the second communication node is part of the second cell or the second carrier, and
initialize a random access procedure or continue with the random access procedure on the second communication node.

16. The communication device of claim 15, further comprising a transmitter configured to:
send a subsequent random access preamble to the second communication node based on a failure to achieve random access with the second communication node from the random access procedure.

17. The communication device of claim 15, further comprising a transmitter configured to:
send a subsequent random access preamble to the first communication node based on a failure to achieve random access with the second communication node from the random access procedure.

18. The communication device of claim 15, further comprising a transmitter configured to:
    send a subsequent random access preamble to a third communication node based on a failure to achieve random access with the second communication node from the random access procedure.

19. The communication device of claim 15, further comprising a transmitter configured to:
    send a radio resource control setup request to the second communication node.

20. The communication device of claim 15, wherein the first communication node has a longer round trip time relative to the communication device than the second communication node.

* * * * *